United States Patent [19]

Renner et al.

[11] Patent Number: 4,745,544

[45] Date of Patent: May 17, 1988

[54] MASTER/SLAVE SEQUENCING PROCESSOR WITH FORCED I/O

[75] Inventors: Karl Renner, Dallas, Tex.; John P. Shanklin, Colorado Springs, Colo.

[73] Assignee: Texas Instruments Incorporated, Dallas, Tex.

[21] Appl. No.: 809,095

[22] Filed: Dec. 12, 1985

[51] Int. Cl.[4] .............................................. G06F 15/16
[52] U.S. Cl. .................................................. 364/200
[58] Field of Search ... 364/200 MS File, 900 MS File, 364/300

[56] References Cited

U.S. PATENT DOCUMENTS 4,539,655 9/1985 Trussell et al. ...................... 364/900
4,674,033 6/1987 Miller ................................... 364/200

Primary Examiner—Raulfe B. Zache
Attorney, Agent, or Firm—Kenneth C. Hill; Thomas W. DeMond; Melvin Sharp

[57] ABSTRACT

An array processor operating in the forced I/O mode includes a master controller (12) for generating sequenced commands for output to slave address generators (52) (54) and (62). The slave (52) and (54) operate in a data processing and a forced I/O mode. Each of the slaves have a set of data instructions and a set of I/O instructions therein. The data instructions are sequenced through in accordance with the sequenced commands generated by the master controller (12) synchronously and in parallel with the other slaves to generate addresses for memories (76) and (80). The master controller (12) initiates the I/O mode with runs independent and asynchronously with respect to the sequenced commands to interface with an external I/O device (98). This data is transferred to the associated data memory and, when full, the operation alternates such that the other slave is in the I/O mode and the other data memory is utilized for storing I/O data.

16 Claims, 7 Drawing Sheets

MASTER/SLAVE SEQUENCING PROCESSOR WITH FORCED I/O

TECHNICAL FIELD OF THE INVENTION

The present invention pertains in general to processors and, more particularly, to increasing the rate of instruction flow through an array processor.

BACKGROUND OF THE INVENTION

As processing requirements increase, the demand for higher throughput, higher density, etc. also increases. As the demand for higher throughputs increases beyond the capability of the single microprocessor, multiple processors have been utilized and interconnected into distributed processing systems. In such systems, each of the processors perform separate tasks or portions thereof to spread the work load equally over the processors. Intercommunication between the processors is usually done using serial transmission techniques and sharing of a common communications bus.

Present microprocessors contain both hardware and software interlocks that provide the capability for a multiprocessor system configuration. Such configurations are provided either by satellite processing (i.e., using special coprocessors), or by using I/O processors that free the CPU from complex tasks that formally required considerable CPU time. These external intelligent requestors cooperate (and compete) for mastership not only of the common shared bus, but also of other shared resources of the system (e.g., memory and I/O space, a peripheral, etc.). In such cases, a management protocol is required in order to make the relationship more equitable than a common master/slave relationship in which the resource-request line is dominated by a single system component. In the most general case, external intelligent requestors may all be CPUs, and thus form a multiprocessor system in which each resource requestor has equal importance and capability. In this way, functions may be distributed fully among those CPUs sharing common system resources. A system design can thus partition the problem into the separate tasks that each of several processors can handle individually and in parallel, increasing the system performance and throughput. In such configurations, these complete and self-contained systems innercommunicate using parallel transmission techniques, usually via a system bus. Appropriate connection links among the processors are provided to free the system designer from having to define which is the master and which is the slave. Furthermore, the system bus allows each processor to work asynchronously and, therefore, both fast and slow microprocessors can be incorporated into the same system.

Some of the more important considerations in multiprocessor systems are (1) the ability of the processor to interact properly without mingling the data; (2) the processor should be able to share system resources; and (3) synchronization among the processors should be ensured. Usually mechanisms for ensuring these requisites are provided by software operating systems, but they do require proper hardware support. Present microprocessors have appropriate control pins and special instructions for semaphore signalling, which temporarily renders one CPU, the "system master" that controls a certain critical share of resources and excludes all other processors from utilizing the resources. Such hardware support allows the development of operating systems to provide the mechanisms for multiprocessing implementations.

One of the disadvantages with multiprocessing systems is that each of the processors in the system operates independent of the other processors to some extent; that is, each of the processors possesses internal software that operates completely independent of the software in the remaining multiprocessors. Each of these multiprocessors is task oriented. The software of the various multiprocessors is therefore not related or interleved, resulting in an inefficient instruction flow in that some of the processors in the systems will have idle time and not be performing a task. Therefore, there exists a need for a more efficient system that more easily distributes the processing load and the instruction flow over the processors in the system while minimizing the amount of idle time of each of the processors of the system. This would result in multiple processors cohesively acting together to perform a particular task or group of tasks.

SUMMARY OF THE INVENTION

The present invention disclosed and claimed herein comprises an array processor with parallel forced I/O operation. The processor includes a control processor acting as a master for generating sequence commands to control instruction flow in the array. Slave processors are provided at each of a plurality of slave nodes. At one of the slave nodes, two slave processors are provides Each of the slave processors is operable to execute an internal set of instructions and generate addresses for output to an associated data memory. At the node with two slave processors, a set of I/O instructions are provided such that one of the slave processors can operate in the background I/O mode and the other data processor can operate in the foreground data processing mode. In the data processing mode, the slave processors sequence through their instruction set synchronously with and in response to the sequenced commands. The I/O mode is entered in response to a sequenced command from the control processor but the instruction flow therein is operated independent of the sequence commands. The data memories are interfaced with a data processor for processing data and also with an I/O port to a switching device. The I/O port only interfaces with the two memories on the single node.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Array Processor

Figure 1:
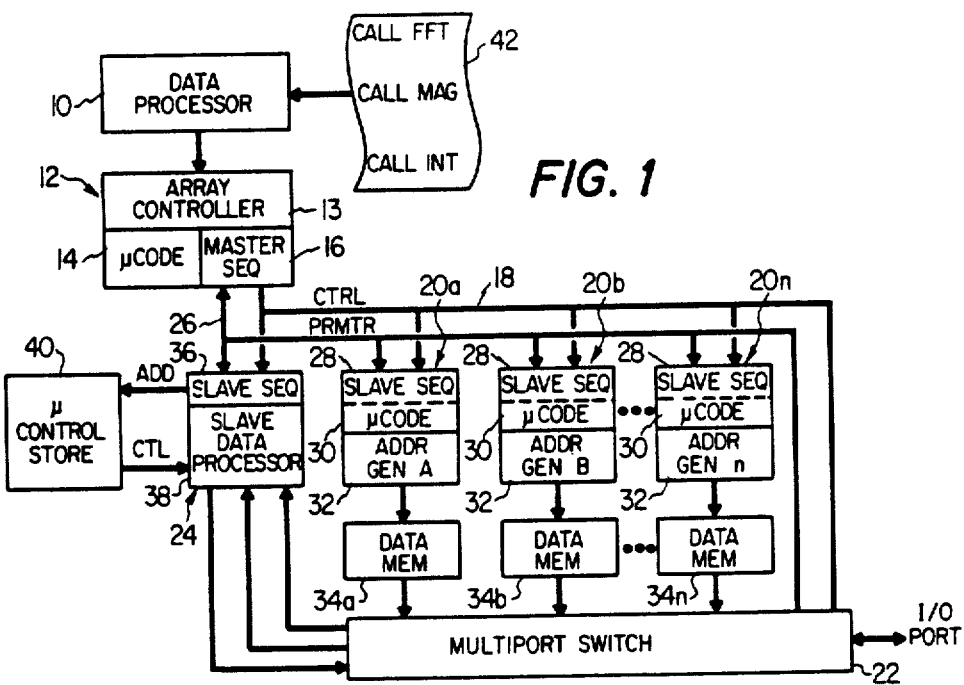
FIG. 1 illustrates a schematic block diagram of the generalized programmable array processor.

Referring now to FIG. 1, there is illustrated a block diagram of the programmable array processor of the present invention. The array processor is generally controlled by a data processor 10 (illustrated in the dotted lines) which controls a number of array processors at various nodes, only one of the array processors being illustrated in the present invention. The array processor is comprised of an array control and sequencer (ACS) 12 which operates as the master of the array processor and controls the instruction flow therein. The ACS 12 has a ROM resident program for storing microcode 14 internal thereto or, alternately, the microcode can be stored in an external ROM (not shown). The master sequencer which is the ACS 12 generates a sequence of control codes for output on a control bus 18. The control bus 18 is interfaced with a plurality of slave devices. The slave devices are comprised of vector address generators 20a-20n, a multipath switch (MPS) 22 and a slave data processor 24. In the present embodiment, the slave data processor illustrated is a vector arithmetic logic unit (VALU). All of the slave devices and the ACS 12 are interfaced with a parameter bus 26 and the control bus 18.

Each of the VAGs 20a-20n are comprised of a slave sequencer 28, ROM resident microcode 30 and an address generator 32. Each of the VAGs 20a-20n are operable to process instructions and generate addresses for output to associated data memories 34a-34n. The outputs of the data memories 34a-34n are input to the MPS 22.

The slave data processor 24 is also comprised of a slave sequencer 36 and a data processing section 38. In the present embodiment, the slave data processor 24 is interfaced with an external ROM 40 for storing microcode. However, it should be understood that the microcode can be ROM resident within the slave data processor 24.

In operation, the data processor determines the particular function for the array processor to perform. These are referred to as macroprograms or macro calls, as illustrated by a block 42. The block 42 represents a queue of macro calls which are input to a program memory (not shown) in a particular order. The ACS 12 is operable to fetch the macro calls for execution thereof.

A number of different tasks can be carried out by the ACS 12 such as performing a Fast Fourier Transform (FFT). A particular task is defined by a command parameter list (CPL) which defines the parameters for the macro call. The ACS 12 performs the task with the parameters in the CPL, the parameters being distributed through the array processor as necessary.

The ACS 12 executes a particular task by outputting a sequence of control signals onto the control bus 18. Each of the VAGs 20a-20n then sequences through a set of internal instructions in response to the control signals provided thereto from the ACS 12 and generates corresponding addresses for input to the respective data memories 34a-34n. In addition, the slave data processor 24 and MPS 22 are also configured by particular control signals from the ACS 12. This operation is synchronous such that for each instruction carried out by the VAGs 20a-20n, a particular switch configuration is provided by the MPS 22 for either receiving data from the memories 34a-34n or inputting data thereto. This data can then be output to the slave data processor 24.

For example, it may be desirable to perform a logical OR function on two data words. One data word can be stored in data memory 34a and one in data memory 34b. In one instruction, both data words can be output from the respective data memories 34a and 34b to two inputs of the slave data processor 24. Slave data processor 24 is controlled during this instruction to perform a logical OR function and provide the results on the output thereof. If desirable, this result can be stored in one of the other data memories 34c-34n. Therefore, in one instruction, the data has been fetched from memory, processed and stored back in memory. A detailed example of the actual instruction flow in the ACS 12 and the various slave devices 20a-20n will be described hereinbelow.

Figure 2:
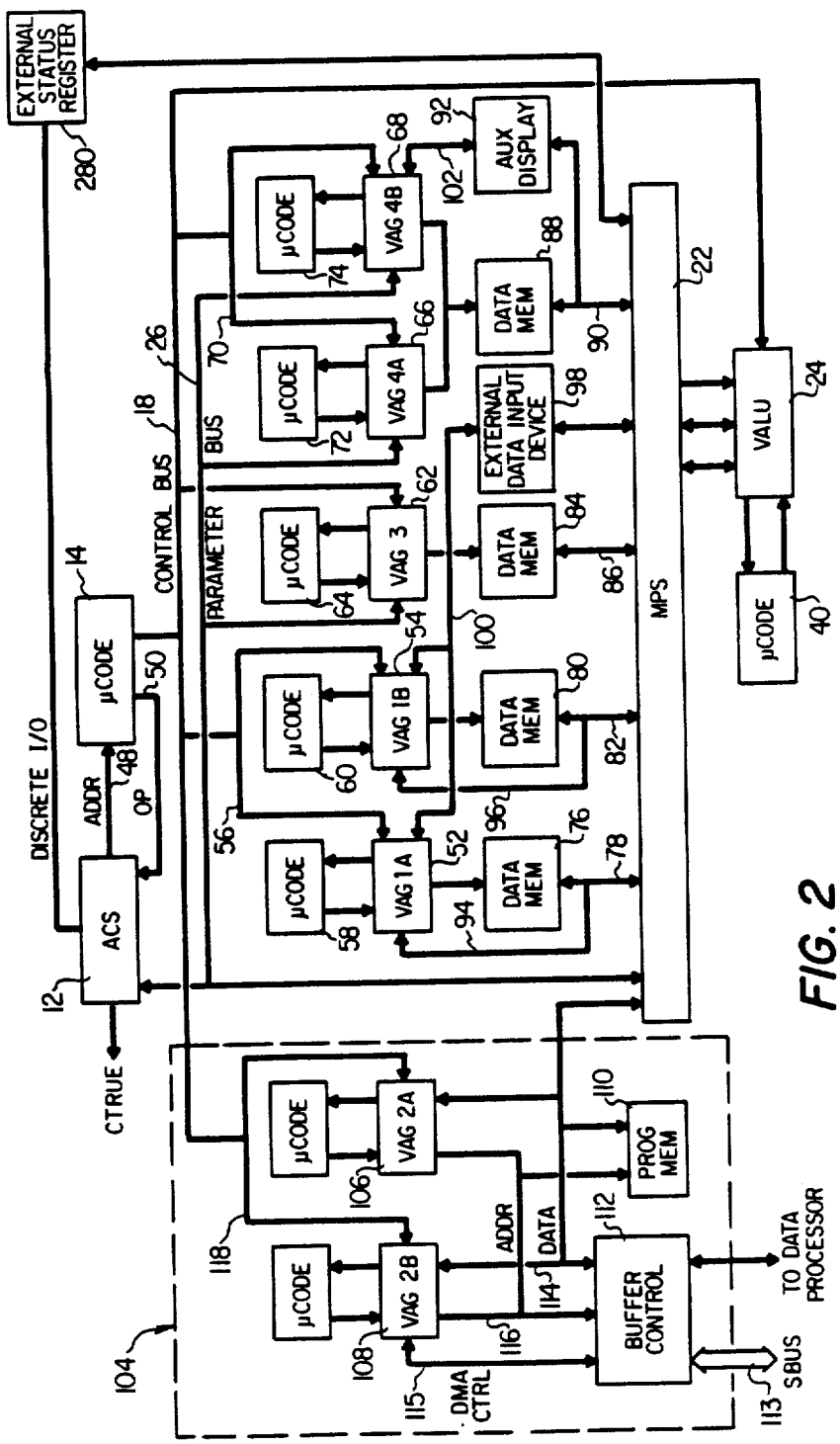
FIG. 2 illustrates a more detailed block diagram of the array processor.

Referring now to FIG. 2, there is illustrated a more detailed schematic block diagram of a particular embodiment of the present invention. In the embodiment of FIG. 2, the VAGs 20a-20n are operated in a normal mode, a forced I/O mode and a cycle stealing mode. The forced I/O mode and the cycle stealing mode will be described in more detail hereinbelow.

The ACS 12 is interfaced with the microcode 14 stored in an external memory through an address bus 48 to address a particular microcode instruction. The microcode instruction is comprised of an op code instruction for the ACS 12 which is output on a bus 50 to the ACS 12 and a control word for output to the control bus 18. The op code is twelve bits long and requires bus 50 to be twelve bits wide. Each of the slave devices connected to the control bus 18 is associated with a discrete number of bits in the control word. The length of the control word therefore depends upon the number of slave devices controlled by the ACS 12 and the number of bits required for control thereof. In the present embodiment, the VAGs and slave data processor require three bit control codes and the MPS 22 requires a five bit control code.

A VAG 52 and a VAG 54 are provided as a combined pair for forced I/O operation and are labeled VAG1a and VAG1b, respectively. VAGs 52 and 54 are connected to common three bits of the control bus 18 through an interconnect bus 56. VAG 52 is interfaced with a microcode storage ROM 58 and the VAG 54 is interfaced with a microcode storage ROM 60. A VAG 62 labeled "VAG3" is interfaced with the control bus 18 and also with a microcode storage ROM 64. A VAG 66 labeled "VAG4a" and a VAG 68 labeled "VAG4b" are combined in operation to perform a cycle stealing operation and are interfaced with three bits on the control bus 18 through an interconnect bus 70. VAG 66 is interfaced with a microcode storage ROM 72 and VAG 68 is interfaced with a microcode storage ROM 74. The forced I/O operation of the VAGs 52 and 54 will be described in more detail hereinbelow.

VAG 52 generates an address for input to a data memory 76, the output of which is interfaced with the MPS 22 through a bus 78. In a similar manner, VAG 54 generates an address for input to a data memory 80, the output of which is interfaced with MPS 22 through a bidirectional bus 82. VAG 62 generates the address for input to a data memory 84, the output of which is interfaced with MPS 22 through a bidirectional bus 86.

VAGs 66 and 68 are operable to generate addresses for output to a common data memory 88, the output of which is interfaced with the MPS 22 through a bidirectional bus 90. In addition, the bus 90 is also interfaced with the input of an auxiliary display 92.

The parameter bus 26 is directly interfaced with the ACS 12 and the VAGs 62, 66 and 68 and also with the MPS switch 22. The parameter bus 26 is indirectly interfaced with VAGs 52 and 54 through the MPS 22. This is effected by connecting the data bus 78 to the parameter bus input of VAG 52 through a bypass bus 94 and the bidirectional bus 82 with the parameter bus input of the VAG 54 to a bypass bus 96. When the MPS 22 is configured in this mode, the parameter bus 26 is effectively input to the VAG 52 and 54 and operates in a manner identical to that with respect to the VAGs 62, 66 and 68.

An external data input device 98 is interfaced with the MPS switch 22 to allow data to be input through the array processor. This data, as will be described hereinbelow with reference to the forced I/O operation, is for input to either the data memory 76 or the data memory 80. To facilitate transfer of data, a handshake line 100 is provided that is interfaced with both the VAG 52 and the VAG 54. In a similar manner, the auxiliary display 92 is interfaced with the VAG 68 through a handshake line 102. The slave data processor 24 utilizes a vector arithmetic logic unit (VALU), hereinafter referred to as VALU 24.

A task control section 104 is defined with dotted lines and is comprised of a VAG 106 labeled "VAG2a" and a VAG 108 labeled "VAG2b". A program memory 110 is provided for storing the command parameter lists (CPL) and a buffer control 112 is provided for interfacing with the data processor 10 and system data through a system bus 113. The buffer control 112 provides all of the controls necessary to effect data transfer to a data bus 114 in response to signals received on control lines 115. The buffer control stores data in internal first in-first out registers (FIFO) that are addressable through an address bus 116. The address bus 116 is commonly connected to the address output of the VAGs 106 and 108. The data bus 114 provides for data input to both the VAGs 106 and 108. The program memory 110 receives addresses from the VAGs 106 and 108. The control bus 18 is interfaced with both VAG 106 and 108 with a three bit interconnect bus 118. VAGs 106 and 108 are combined to operate in a cycle stealing mode, as will be described hereinbelow.

In operation, the CPL is first loaded into program memory 110 by the data processor from the system bus 113 and arranged in a queue of separate tasks. The ACS 12 monitors the program memory and sequentially executes these tasks. The ACS 12 initiates a given task by generating an appropriate control word for the VAG 106 to address program memory 110 and output data on bus 114. Simultaneously, the MPS 22 receives an appropriate control word to interconnect the data bus 114 with the parameter bus 26. This allows the ACS 12 to receive the appropriate parameters from the program memory 110 defining the first step in the task. The ACS 12 then initiates operations in the remaining VAGs 52, 54, 62, 66 and 68 by sending an appropriate initiation code on the control bus 18 thereto in order to properly initiate and synchronize the operation thereof. Parameters are then loaded from the parameter bus 26 to the VAGs 62, 66 and 68 and to the VAGs 52 and 54 through the MPS 22 and bypass buses 94 and 96. The initial parameters are such things as constants that are required for normal processing routines.

Each of the VAGs in the system have internal software to run a particular routine with each having the same internal software. The ACS 12 initializes the VAGs at particular starting addresses internal thereto. The ACS 12 then sequences through an internal routine which addresses the microcode storage 14 to output control words on the control bus 18. These control words cause each of the VAGs connected thereto to sequence through internal instructions. The instructions causes addresses to be generated to address the associated data memory for output data to the MPS 22 or receive data therefrom. The MPS 22 would then interface the output of select ones of the data memories to the VALU 24 for processing of the data. A detailed example of instruction flow will be described hereinbelow.

It is important to understand that the instruction flow in the ACS 12 and the instruction flow in the VAGs 52, 54, 62, 66 and 68 are synchronized, with the ACS 12 providing sequencing controls to control the instruction flow in the VAGs. For example, one instruction code may require VAG 52 to address the memory to output one data word to one input of VALU 24 with the VAG 62 addressing the data memory 84 to output a second data word for input to a second input of VALU 24. In the same clock cycle the VAG 62 is controlled to write the result from the output of the VALU 24 into the data memory 84. Therefore, the instructions of the various VAGs are interleved but operate asynchronously as a single set of instructions to execute a particular task. This is to be distinguished from a distributive system wherein background tasks are performed by other processor units with each background task being separate and distinct from the foreground task.

Array Controller and Sequencer

Figure 3:
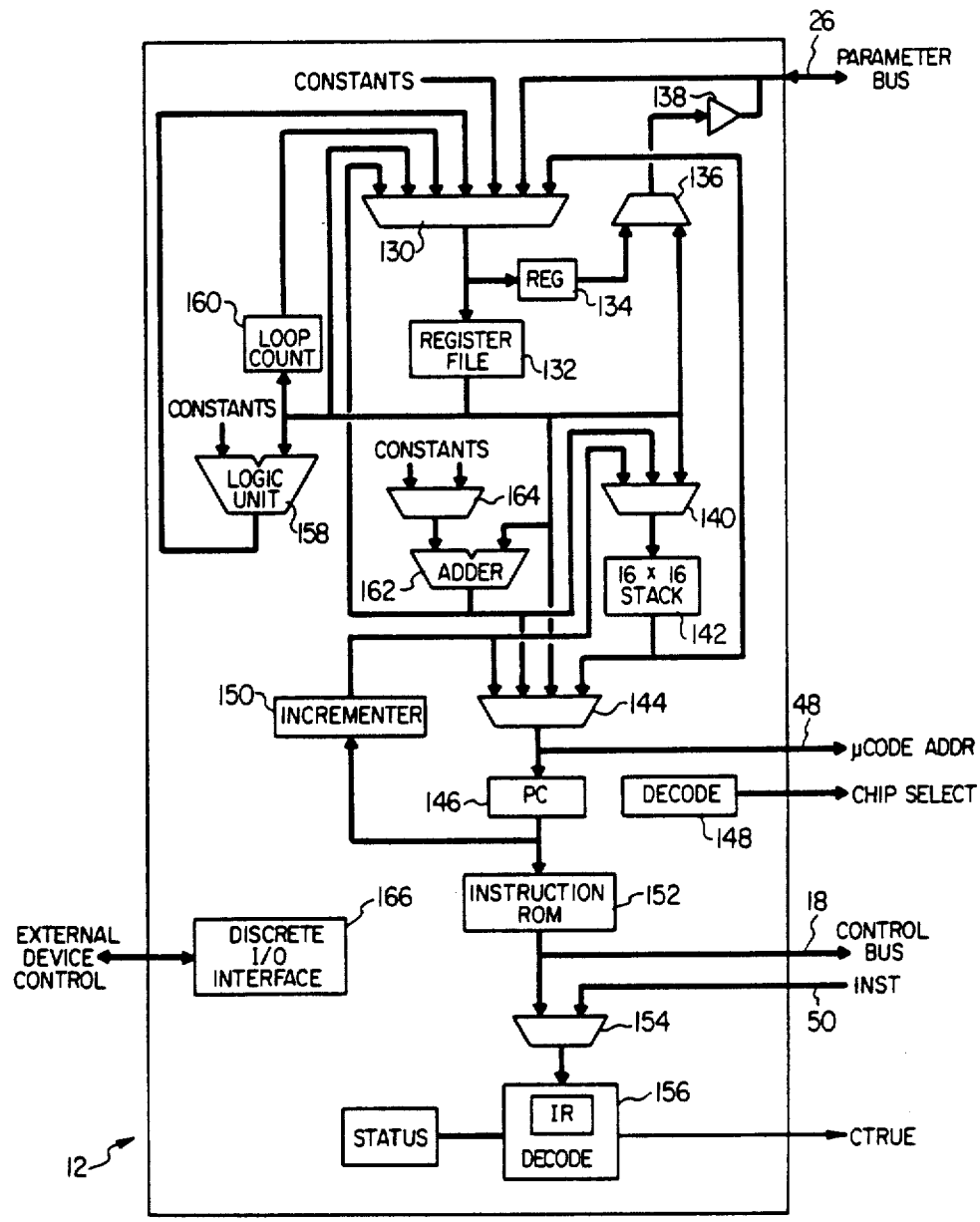
FIG. 3 illustrates a schematic block diagram of the array controller and sequencer.

Referring now to FIG. 3, there is illustrated a schematic block diagram of the ACS 12. The parameter bus 26 is input to a multi-input multiplexer 130, the output of which is input an 8×16 register file 132. The output of the multiplexer 130 is also connected to the input of a register 134, the output of which is connected to one input of a two input multiplexer 136. The output of the register file 132 is also input to the multiplexer 136. The output of multiplexer 136 is connected to the parameter bus through a buffer 138. The register file 132 is operable to store parameters received from the parameter bus.

The output of register file 132 is input to a three input multiplexer 140, the output of which is connected to a 16×16 data stack 142. The output of data stack 142 is input back to one of the inputs of multiplexer 130 and also to one input of a four input multiplexer 144. The output of multiplexer 144 is connected to address bus 48 and also to the input of a program counter (PC) 146. The multiplexer 144 has sixteen bits output therefrom, eleven of which are input to the PC 146 and all of which are output to address bus 48 for input to the external microcode memory 14. In addition, multiple microcode memories can be utilized with three bits output by the multiplexer 144 being input to a decode circuit 148 for a chip select operation.

The output of the PC 146 is looped back to the input of the multiplexer 144 through an incrementing circuit 150 and also input an internal instruction ROM 152. The output of the incrementing circuit 150 is also input to one input of the multiplexer 140 for input to the data stack 142. The instruction ROM 152 is operable to output both the control word to the control bus 18 and also an op code for internal use by the ACS 12. The op code is input to a two input multiplexer 154, the output of which is input to an instruction register decode circuit 156. The instruction register decode circuit 156 provides all the microcode instructions for controlling the ACS 12. The multiplexer 154 also receives the op code output from the external microcode memory 14 on op code bus 50.

The instruction ROM 152 is an internal instruction ROM as opposed to the external microcode instruction ROM 14. In one mode, multiplexer 154 is controlled to receive only op code information from the external memory 14 with the control bus 18 interfaced with the external memory. In the second mode, the instructions are stored in the internal instruction ROM 152 and output therefrom to the control bus 18.

In order to perform some of the miscellaneous processing in the ACS 12, other circuitry is provided. A logic unit 158 which can be any type of logic, such as an arithmetic logic unit (ALU), is provided which receives the output of the register file 132 and also a constant. The logic unit 158 performs any type of logic desired for output back to the input of the multiplexer 130 for storage in the register file 132. The output of the register file 132 is also input to a loop counter 160 to increment or decrement a value, the output of which is connected back to the input of the multiplexer 130 for storage in the register file 132. An adder 162 is provided with one input thereof connected to the output of the register file 132 and the other input thereof connected to the output of a multiplexer 164. The multiplexer 164 selects between various constants. The output of the adder 162 is input to both the one input of the multiplexer 130 and also one input of the multiplexer 140.

The multiplexer 144 which both provides the microcode address on the bus 48 and also inputs this address to the PC 146 has the other inputs thereof connected to the output of the register file 132 and the output of the adder 162. The miscellaneous circuitry provides for such processing techniques as looping and branching. An I/O interface 166 is provided for allowing the ACS 12 to interface with various external devices. This allows the ACS 12 to be interfaced with other devices external thereto in order to enhance the operation of the array processor.

Vector Address Generator

Figure 4:
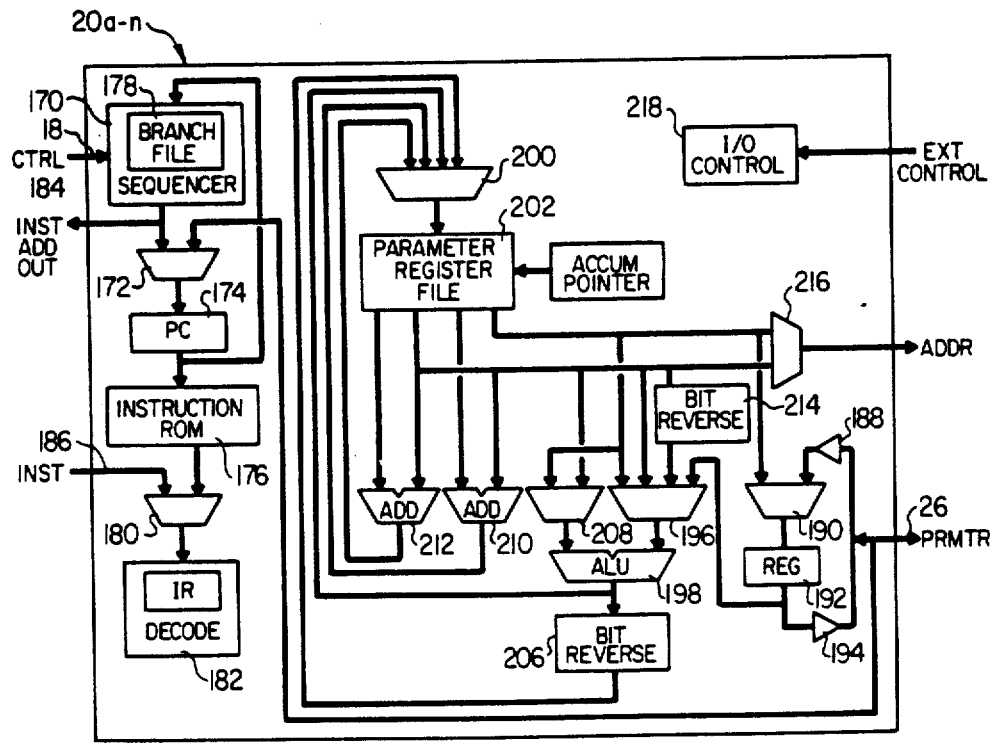
FIG. 4 illustrates a schematic block diagram of the vector address generator.

Referring now to FIG. 4, there is illustrated a schematic block diagram of the VAGs 20a-20c. The control bus 18 is input to a sequencer 170, the output of which is input to one input of a multiplexer 172. The multiplexer 172 feeds a program counter (PC) 174, the output of which is connected to an instruction ROM 176. In addition, the output of PC 174 is input back to sequencer 170. The sequencer 170 has a branch file 178 contained therein which has a predetermined number of branch addresses such that the address in the PC 174 causes a branch address to be output to the mutliplexer 172.

The instruction ROM 176 has the output thereof connected to a multiplexer 180, the output of which is connected to an instruction register decode circuit 182. In operation, the address output of PC 174 selects a predetermined instruction from ROM 176 for output to decode circuit 182. This provides the microcode instruction for execution. Alternatively, the output of the sequencer can be output to an external microcode ROM (not shown) on a line 184. The instruction code output by the ROM is input to the other input of the multiplexer 180 on a line 186. In this mode of operation, the multiplexer 180 is controlled to select the output from the external ROM instead of from internal ROM 176.

To initiate the operation and provide an initial value in the PC 174, the parameter bus 26 is input to the other input of the multiplexer 172. An initiating control code is provided by ACS 12 on the control bus 18 to input twelve bits of this value into PC 174. The remaining four bits are input to a mode register (not shown) which is utilized for various modes such as I/O, retrieving data from program memory, etc. Thereafter, the value can be stepped by an appropriate control on the ACS 12, branched to a select one of the branch addresses in the branch file 178 or other functions as will be described hereinbelow.

The parameter bus 26 is connected through a buffer 188 to one input of a multiplexer 190, the output of which is input to a register 192. The output of register 192 is input through a buffer 194 to parameter bus 26 and also to one input of a multi-input multiplexer 196. The output of multiplexer 196 is input to one input of an ALU 198, the output of which is input to one input of a multiplexer 200. The output of multiplexer 200 is input to a parameter register file 202 for storing the parameters received from parameter bus 26. The output of ALU 198 also goes through a bit reverse circuit 206 and then to the input of multiplexer 200. The other input of ALU 198 is connected to the output of a multiplexer 208, both inputs of which are connected to various outputs of the register file 202. Adders 210 and 212 are also provided having two inputs connected to two separate inputs of parameter register file 202 and the outputs thereof connected back to two separate inputs of multiplexer 200. The multiplexer 196 has three remaining inputs, two of which are connected to various outputs of the parameter register file 202 and the other of which is connected to an output of the parameter register file 202 through a bit reverse circuit 214. A multiplexer 216 is provided for receiving two outputs from the parameter register file 202 and outputting the memory address to the respective data memories 34a-34n.

In operation, a particular processing step can be carried out by outputting the appropriate instruction from the instruction ROM 176 to the decode circuit 182. Various processing operations such as looping, branching, etc., can be carried out in order to output the appropriate address to the data memories 34a-34n. In addition, an I/O control 218 is provided for outputting the appropriate external control signals to control the data memory, such as the Read/Write signals. Therefore, the VAG provides all necessary operations to generate an address to address a particular memory location in the associated one of the memories 34a-34n. It is only necessary for the ACS 12 to provide sequence controls to have the ACS sequence through a program which is stored in the instruction ROM 176. Once the PC 174 is initialized at the appropriate starting location for the VAG, this program then can be sequenced or stepped through merely by providing a stepping control on the control input to the VAG. Each of the VAGs in the array processor has identical programming requiring only the appropriate initialization address. Once initialized, the entire program in each VAG can be stepped through from the starting address merely by providing sequencing controls. In addition, select VAGs can be reinitialized to other routines as necessary.

Slave Data Processor

Figure 5:
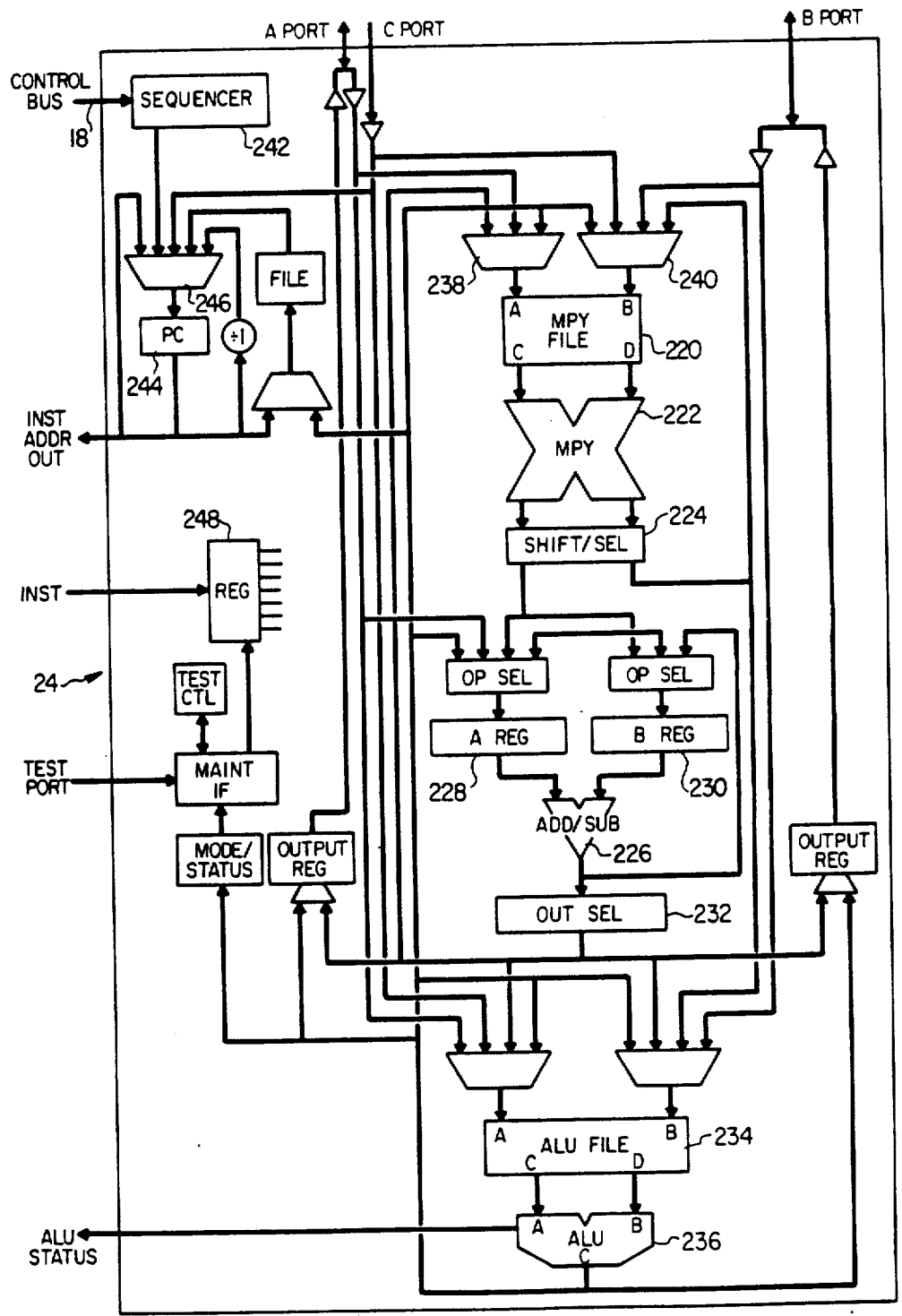
FIG. 5 illustrates a schematic block diagram of a vector arithmetic and logic unit utilized as a data processing element.

Referring now to FIG. 5, there is illustrated a schematic diagram of the slave data processor or VALU 24 showing some of the functional circuits therein. It should be understood that the VALU is only one type of data processing circuit utilized and other circuits can be utilized with the present invention. Some of the functions performed by the VALU 24 illustrated in FIG. 5 are those of an arithmetic logic unit (ALU), a multiplier section and an adder/subtractor section. Each of the sections is individually interfaced with the inputs and outputs in its various files and registers associated therewith. The multiplier section is formed from a multiplier file 220, a multiplier 222 and a shift/select 224. The add/substract section is fabricated from an adder/subtractor circuit 226, an A-input register 228 and a B-input register 230 with the output process through a shift/select circuit 232. The ALU section consists of an ALU file 234 and an ALU circuit 236.

The input ports are labeled A, B and C and consist of sixteen bit data buses, the A- and B-ports being selected for input and output functions with the C-port selected only as an input port. The A-, B- and C-ports are selected as inputs to the A- and B- inputs of the multiplier file 220 by a multiplexer 238 and 240, respectively. Multiplexer 238 selects the inputs from A- port and also the output of the ALU 236 and the output of the shift/select circuit 232 in the add/subtract section. The multiplexer 240 selects between the B- and C- input ports and also between the output of the ALU 236 and the output of the shift/select circuit 224 of the multiplier section. The inputs received from multiplexers 238 and 240 are processed through multiplier file 220 and multiplier 222 operates thereon to process the results in the shift/select circuit 224 to perform the overall multiplication. The multiplication utilizes Booth's algorithm.

The control bus 18 is input to a sequencer 242, the output of which is input to a program counter (PC) 244 through a multiplexer 246 to output the instruction address to the microcontrol ROM 40 (not shown). The instructions output from the microcontrol ROM 40 are input to an instruction decode and register 248 and also back to the PC 244 through multiplexer 246.

The VALU 24 of FIG. 5 performs various arithmetic operations under control of both the command provided on the control bus 18 and the internal software stored in the microcontrol ROM 40. In addition, parameters can be placed into the VALU 24 from the parameter bus through the MPS 22. The operation of the VALU 24 is described in more detail in U.S. patent application Ser. No. 677,153, filed Dec. 3, 1984 and assigned to Texas Instruments Incorporated. Any type of data processor can be utilized which receives data, performs a predefined logical operation on the data and is operable to return the data to the MPS 22 in accordance with the instruction flow as controlled by the slave ACS 12 but, rather, instead of a VALU, a fixed combinational logic circuit could be utilized. It is also not necessary that the slave data processor 24 be reconfigurable or be "slaved" by the ACS 12. The particular operation performed by the slave data processor 24 depends primarily upon the particular application.

The VALU 24 is illustrated as being interfaced with the parameter bus 26. However, the parameter bus 26 is actually interfaced indirectly with the VALU 24 through either the VAG's 52 or 54. Parameters are input to bus 78 or 82 through MPS 22 for storage in the data memory 76 or 80. The VAG's 52 or 54 are then controlled to transfer the parameters to VALU 24 though the A-data port. There parameters are utilized for initialization purposes.

Multipath Switch

Figure 6:
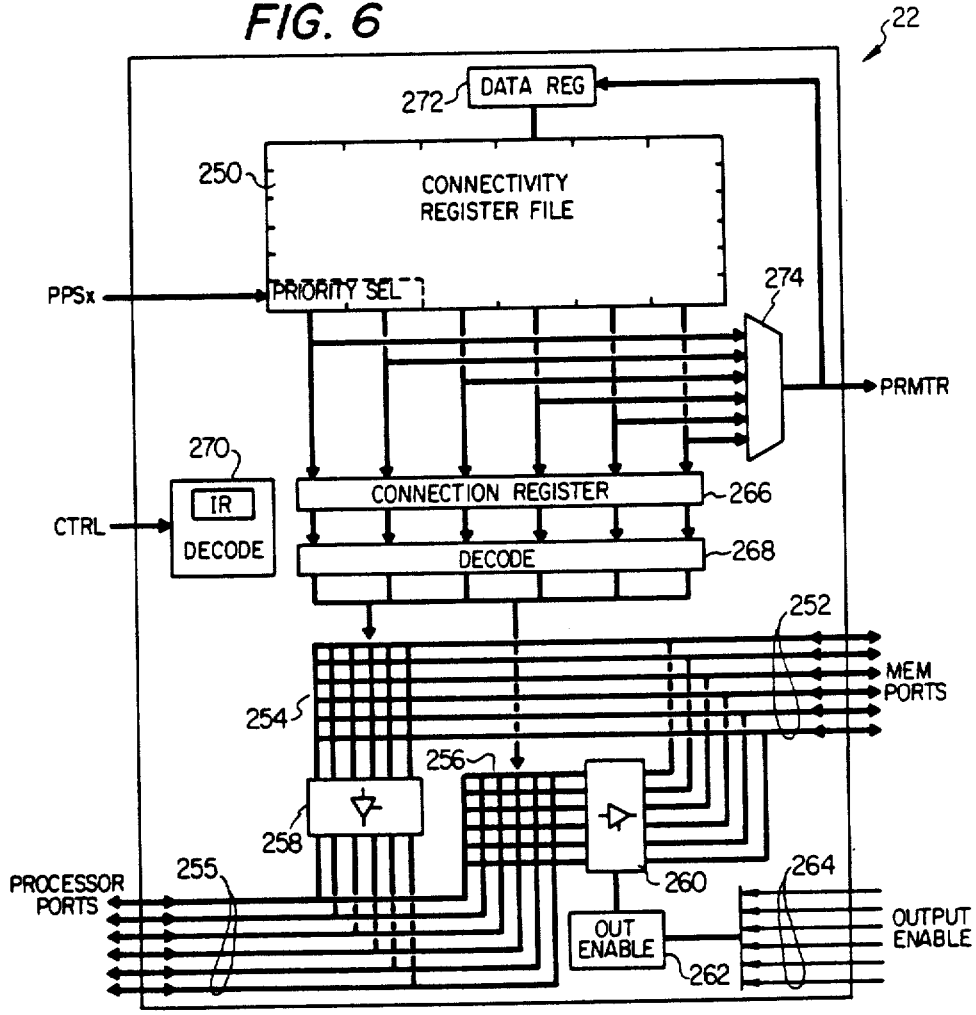
FIG. 6 illustrates a schematic diagram of the multipath switch.

Referring now to FIG. 6, there is illustrated a schematic block diagram of a portion of the MPS 22. The MPS 22 in the preferred embodiment is utilized for sixteen bit words and is divided into four portions, one for each of four four-bit sections. The MPS 22 has six processor ports and six memory ports, the processor and memory ports being bidirectional. The four-bit portion of the MPS 22 illustrated in FIG. 6 has a connectivity register file 250 for storing a particular connectivity pattern in rows and columns. Six bidirectional four-bit lines 252 are interfaced between the memory ports and a 6×6 crosspoint switch 254. Six four-bit ports and a 6×6 crosspoint switch 254. Six four-bit buses 256 are interfaced between the sixth processor ports and a 6×6 crosspoint switch 257. Each point in the crosspoint switches 254 and 257 is comprised of four bits.

The crosspoint switch 254 is connected to the input of a buffer 258, the output of which is connected to the six four-bit buses 256 and the crosspoint switch 257 is input to a buffer 260, the output of which is connected to the six four-bit buses 252. The buffer 260 is enabled by an output enable circuit 262 which is connected to six one bit output enable lines 264.

The connectivity register file 250 is arranged such that a single row of six four-bit words is output to a current connection register 266 for storing a connection pattern for a given row in the register file 250. Each of the four bit words is input to a bank of six four-to-twelve decoders 268 which output six twelve-bit decode lines. Three of the twelve decode lines are input to crosspoint switch 254 and three of the twelve decode lines are input to crosspoint switch 254. The thirty-six decode lines input to each of the crosspoint switches 254 and 257 determine the connection pattern. Therefore, six four-bit words in a particular row of the register file 250 determines the particular connection pattern.

An instruction register and decode circuit 270 is provided for interfacing with the parameter bus 26 and requires five bits of information to determine the particular operation that is being performed. The MPS 22 does no processing and merely allows connection patterns to be stored in the register file and output therefrom. Essentially, the commands received from ACS 12 point to a particular row and column or columns. The connection patterns will be discussed in more detail hereinbelow.

The register file 250 is loaded from the parameter bus 26 through a data register 272 which inputs four bits at a time. Since the parameter bus is sixteen bits long, only four bits of each of the data words on parameter bus 26 is loaded into each of the portions illustrated in FIG. 6. Alternatively, each of the four bits in each of the columns in the connectivity register file 250 can be output through a multiplexer 274 to the parameter bus 18.

Instruction Flow Example

Figure 7:
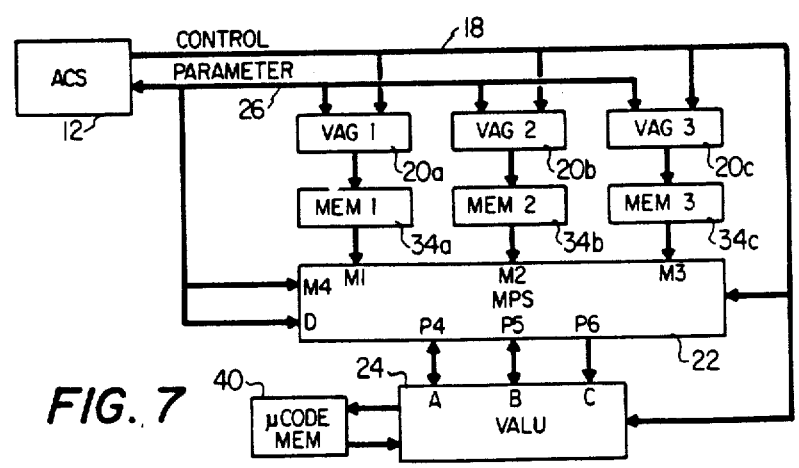
FIG. 7 illustrates a block diagram of an illustrative example of the array processor.

Referring now to FIG. 7, there is illustrated a simplified block diagram of the array processor of FIG. 1 illustrating three VAGs 20a-20c and three respective data memories 34a -34c. A VALU is utilized for the slave data processor 24. The embodiment of FIG. 7 will be utilized to describe a simple array processor example wherein the array processor is utilized to perform a vector addition of two eight-word vectors as illustrated in Table 1. The two input vector operands are stored in data memories 34a and 34c at addresses zero through seven. The resultant sum vector is to be written into memory 34b. The Read and Write operations will be controlled by the three VAGs 28a-28c.

TABLE 1

| | VECTOR ADDITION | | |
|---|---|---|---|
| | Memory | | |
| Address | Mem 1 | Mem 3 | Mem 2 |
| 0 | 0 | 0 | 0 |
| 1 | 1 | 1 | 2 |
| 2 | 2 | 2 | 4 |
| 3 | 3 | 3 | 6 |
| 4 | 4 | 4 | 8 |
| 5 | 5 | 5 | A |
| 6 | 6 | 6 | C |
| 7 | 7 | 7 | E |

The memories 34a-34c consist of two static RAMs (SRAM) which are required for sixteen bits of data. Since the VALU 24 contains no onboard control ROM, this device utilizes external control memory 40 which consists of eight SRAMS to make up the sixty four bit microinstruction word. The MPS 22 is configured with the necessary data path connections by the ACS prior to performing these extra additions. The MPS 22 has four memory ports M1-M4 and three processor ports P4-P6. The parameter bus 26 is input to both a data input (B) for inputting connection data to the MPS 22 and also is connected to the M4 input for allowing data to be input directly to VALU 24. The VALU 24 has an A-, B- and C-port for receiving data. The A- and B-ports are bidirectional with the C-port being unidirectional. The connection of the parameter bus 26 to the M4 port of the MPS 22 allows the VALU 24 to be initialized with a macroprogram starting address by its data port A.

The MPS 22 is configured with the necessary data path connections by loading the connectivity register file with four different connections as illustrated in Table 2. In Table 2, the connectivity register file has six columns and six rows. The first row contains the initialization pattern with M4 connected to P4 to allow the VALU 24 to be initialized. In the second row R2, the memory ports M1 and M3 are connected to processor ports P4 and P6, respectively, to allow connection of the memories 34a and 34c to the A- and B- ports of the VALU 24. The processor port P5 is connected to memory port M2 to allow the B-port of VALU 24 to be connected to data memory 34b. Table 2 also illustrates the command codes required to write the four bit data into the register file.

TABLE 2

| | P1 | P2 | P3 | P4 | P5 | P6 |
|---|---|---|---|---|---|---|
| R1 | x | x | x | M4PP4 | x | x |
| R2 | x | x | x | M1PP4 | P5PM2 | M3PP6 |
| R3 | x | x | x | x | x | x |
| R4 | x | x | x | x | x | x |
| R5 | x | x | x | x | x | x |
| R6 | x | x | x | x | x | x |

| MPS Control Codes | |
|---|---|
| CLR | clear connectively register file |
| PT1 | point to row 1 |
| WR4,#4 | write 0100 to field P4 |
| PT2 | point to row 2 |
| WR4,#1 | write 0001 to field P4 |
| WR5,#A | write 1010 to field P5 |
| WR6,#3 | write 0011 to field P6 |

After the ACS 12 has completed initialization of the MPS 22, the VAG accumulator pointers must be initialized. The accumulator pointers correspond to four four-bit codes of register zero of the parameter register file. Each code specifies a file register that serves as either accumulator zero (A0) or accumulator one (A1) for either foreground or background processing. Table 3 illustrates the control memory for a given VAG with the control memory being identical for each of the three VAGs 24a-24c. It consists of three macroprograms, the first of which serves to load the hex value 2100 into register R0 and hex value 0000 into registers R1 and R2. The accumulator A0 corresponds to register R2 and accumulator A1 corresponds to register R1. The ACS 12 will issue an initialization code INIT to each of the VAG which will initialize the VAG to the macrostarting address, then a sequence of STEP codes which step the VAG through the macroprogram, an EXEC code and finally a NOOP code, which is a non operation code. The EXEC code serves to execute the next to the last instruction yet keeps the PC pointing to the last instruction which is a STOP/NOOP code. Each VAG and macroprogram is padded with a STOP/NOOP code at the end so that this instruction will be in the VAG instruction register when the macroprogram execution is completed.

TABLE 3

| VAG Control Memory | | |
|---|---|---|
| Hex Address | Microinstruction | Comments |
| 000 | STOP\|NOOP | — |
| 000-5FF | reserved for self test | |
| 600 | 0→B0 | accumulator setup: |
| 601 | B0→R0 | 2100→R0 and |
| 602 | B0→R1 | initialization: |
| 603 | B0→R2 | 0000→A0,A1 |
| 604 | NEXT\|LUBI R0 #21 | |
| 605 | RESERVE | |
| 606 | STOP\|NOOP | |
| 607 | NEXT\|A0+1→A0\|READ | vector read macro |
| 608 | STOP\|NOOP | |
| 609 | NEXT\|A0+1→A0\|WRITE | vector write macro |
| 60A | STOP\|NOOP | |
| R0,R1,R2 | = parameter file registers | |
| B0 | = PC branch file register | |
| A0 | = accumulator zero register | |

A sequence of NOOP codes are sent to the VAG until the next INIT code is sent. When the next INIT code is registered in the VAG, the STOP/NOOP code will be executed resulting in a NOOP being performed. The remaining two VAGs macroprograms are used for the vector addition read and write operations. Again, the INIT code is used to initialize the VAGs with the macroprogram starting address and then a sequence of EXEC codes are sent to execute the first microinstruction a requisite number of times.

In Table 3, the hex codes 600 to 606 correspond to the accumulator set up. The macroinstruction for reading is initialized at address 607 and loops back on itself to increment the accumulator register 80 to read eight data words from the data memory. In a similar manner, initialization at hex address 609 allows a Write instruction to loop back on itself to write a block of eight data words to the memory.

The VALU 24 control memory is illustrated in Table 4. The memory includes a macroprogram initialized at hex address 002 for loading the value on port A the ALU file register A0 and the value on part C to the ALU file register A1. The file registers A0 and A1 are then added to provide an output result which is output through port B. This is a simple vector addition performed by the VALU 24 to comprise the data processing portion of the array processor.

control codes are repeatedly output during each loop. The same compression can be achieved as the VAGs are stepped through the accumulator set up macroprogram. The control memory layout for the ACS 12 is illustrated in Table 5.

TABLE 5

| | Slave Control Codes | | | | | |
|---|---|---|---|---|---|---|
| Hex Address | MPS | VAG 1 | VAG 2 | VAG 3 | VALU | ACS Microinstr |
| 000 | HALT | HALT | HALT | HALT | HALT | NOOP |
| 001 | NOOP | NOOP | NOOP | NOOP | NOOP | BL @ 200 |
| 002 | NOOP | NOOP | NOOP | NOOP | NOOP | RESERVE | branch to |
| 003 | NOOP | NOOP | NOOP | NOOP | NOOP | NOOP | main program |
| 200 | CLR | NOOP | NOOP | NOOP | NOOP | DUP 4 |
| 201 | PT1 | NOOP | NOOP | NOOP | NOOP | NOOP |
| 202 | WR4 | NOOP | NOOP | NOOP | NOOP | DUP 1 |
| 203 | PT2 | NOOP | NOOP | NOOP | NOOP | DUP A | setup MPS |
| 204 | WR4 | NOOP | NOOP | NOOP | NOOP | DUP 3 |
| 205 | WR5 | NOOP | NOOP | NOOP | NOOP | LI 4 CO |
| 206 | WR6 | NOOP | NOOP | NOOP | NOOP | RESERVE |
| 207 | CN1 | NOOP | NOOP | NOOP | NOOP | LP 600 |
| 208 | NOOP | NOOP | NOOP | NOOP | NOOP | RESERVE | init VAG |
| 209 | NOOP | NOOP | NOOP | NOOP | NOOP | NOOP | acc setup |
| 20A | NOOP | INIT | INIT | INIT | NOOP | BGZD CO @ 20B |
| 20B | NOOP | STEP | STEP | STEP | NOOP | BGZD CO @ 20B |
| 20C | NOOP | EXEC | EXEC | EXEC | NOOP | LP 607 | VAG accum |
| 20D | NOOP | NOOP | NOOP | NOOP | NOOP | RESERVE | setup |
| 20E | NOOP | NOOP | NOOP | NOOP | NOOP | LP 609 |
| 20F | NOOP | INIT | NOOP | INIT | NOOP | RESERVE |
| 210 | NOOP | NOOP | NOOP | NOOP | NOOP | LP 2 | init |
| 211 | NOOP | NOOP | INIT | NOOP | NOOP | RESERVE | vector |
| 212 | CN2 | NOOP | NOOP | NOOP | NOOP | LI 3 CO | add |
| 213 | NOOP | NOOP | NOOP | NOOP | INIT | RESERVE |
| 214 | NOOP | EXEC | NOOP | EXEC | NOOP | NOOP |
| 215 | NOOP | EXEC | NOOP | EXEC | EXEC | BGZD CO @ 216 |
| 216 | NOOP | EXEC | EXEC | EXEC | EXEC | BGZD CO @ 216 |
| 217 | NOOP | STEP | EXEC | STEP | EXEC | NOOP | vector |
| 218 | NOOP | EXEC | EXEC | EXEC | EXEC | NOOP | add |
| 219 | NOOP | NOOP | STEP | NOOP | EXEC | NOOP |
| 21A | NOOP | NOOP | EXEC | NOOP | STEP | NOOP |
| 21B | NOOP | NOOP | NOOP | NOOP | EXEC | BI @ 21C |
| 21C | NOOP | NOOP | NOOP | NOOP | NOOP | BI @ 21C | idle |

TABLE 4

| VAG Control Memory | | |
|---|---|---|
| Hex Address | Microinstruction | Comments |
| 000 | NOOP | |
| 001 | NOOP | |
| 002 | PTA→A0\|PTC→A1\|A0+A1→ OUTB\|OUTB→PTB | vector |
| 003 | NOOP | add macro |
| PTA,PTB,PTC | = ports A,B,C | |
| A0,A1 | = ALU file registers | |
| OUTB | = output register at port B | |

The ACS microprogram code may be compressed by identifying consecutive clock cycles during which the same control codes are repeatedly output. This is usually utilized for looping where the ACS 12 addresses the same memory locations multiple times wherein The initial address of the ACS 12 which is the address that the ACS 12 resides at when not operating, results in slave control codes being output onto the parameter bus 26 and an op code being input back to the ACS 12 as an ACS microinstruction. At the initial address 000, all of the slave devices have a HALT control sent thereto with a NOOP microinstruction for the ACS 12. Initially on power up, slave devices do not respond to the HALT command because they are not in a normal running mode. They automatically reset themselves to the address 0000. The HALT instruction in the normal operating mode causes the slave devices to stop processing without requiring the internal registers to reside at any particular address. The next instruction address 001 is a branch address to branch to address 200 which is where the main program resides. At address 200, the MPS 22 is cleared with a CLR command and a DUP 4 microinstruction is provided to the ACS 12. The DUP 4 instruction causes the value 4444 to be placed onto the parameter bus for writing at hex address 202. This delay is due to the pipelining configuration of the ACS 12. In hex addresses 201 and 202, the commands PT1 and WR4 are sent to the MPS 22 to point to row one and write to column 4. Subsequently, a DUP 1, DUP A and DUP 3 command are executed to write respective values on the parameter bus and load them into the second row, positions four, five and six. The MPS 22 is set up between hex addresses 100 to 206.

At hex address 207, the accumulator set up for the VAGs is initiated by sending a connection command to the MPS to provide the connection in row one and the value 600 is loaded on to the parameter bus 26. An initialization code INIT is sent out to the VAGs at hex address 20A and the program looped at hex address 20A and 20B for a predetermined number of times, as defined by the value stored in register CO at hex address 205. At hex address 20B, the program counter of the VAGs is stepped and at hex address 20C, the VAG instruction is executed. This provides the VAG accumulator set up.

After the accumulator set up, the vector add operation is initialized at hex address 20E by sending the INIT command to both VAG 1 and VAG 3 in hex address 20F. The INIT command initializes the program counter at address 607 which was placed on the parameter bus at hex address 20C. VAG 2 is initialized at hex address 211 at starting address 609 which was loaded on the parameter bus at hex address 20E. The connection pattern for row 2 of the register file in MPS 22 is made at hex address 212 and the VALU is initialized at hex starting address 002 by hex address 213, the address loaded on the parameter bus in hex address 210.

After initialization of the vector add operation, the actual addition of vectors is performed by providing an EXEC command at hex address 214 to the VAG 1 and VAG 2 and then providing a loop at hex address 216. The loop value is loaded into register CO of the ACS 12 at hex address 212. The program goes into a pipe down phase between hex address 217 and 21A and, at hex address 21b, goes into an idle loop.

In order to more fully describe the operation of the system, a clock timing diagram is provided in Table 6, which illustrates the clock by clock timing of the ACS 12 in initializing the program and performing the vector add operation of the present example.

TABLE 6

| | | Registers | | | Outputs | | Slave Control Codes | | | | | |
|---|---|---|---|---|---|---|---|---|---|---|---|---|
| CK | PC | IR1 | IR2 | CO | CTRUE | PBUS | MPS | VAG1 | VAG2 | VAG3 | VALU | |
| 1 | 000 | X | X | X | 1 | Z | HALT | HALT | HALT | HALT | HALT | |
| 2 | 001 | NOOP | X | X | 0 | Z | NOOP | NOOP | NOOP | NOOP | NOOP | branch |
| 3 | 002 | BL @ 200 | X | X | 1 | Z | NOOP | NOOP | NOOP | NOOP | NOOP | to main |
| 4 | 003 | BL @ 200 | 0200 | X | 0 | Z | NOOP | NOOP | NOOP | NOOP | NOOP | program |
| 5 | 200 | NOOP | 0200 | X | 0 | Z | CLR | NOOP | NOOP | NOOP | NOOP | |
| 6 | 201 | DUP 4 | 0200 | X | 0 | Z | PT1 | NOOP | NOOP | NOOP | NOOP | |
| 7 | 202 | NOOP | 0200 | X | 0 | 4444 | WR4 | NOOP | NOOP | NOOP | NOOP | |
| 8 | 203 | DUP 1 | 0200 | X | 0 | Z | PT2 | NOOP | NOOP | NOOP | NOOP | configure |
| 9 | 204 | DUP A | 0200 | X | 0 | 1111 | WR4 | NOOP | NOOP | NOOP | NOOP | MPS |
| 10 | 205 | DUP 3 | 0200 | X | 0 | AAAA | WR5 | NOOP | NOOP | NOOP | NOOP | |
| 11 | 206 | LI 4 CO | 0200 | X | 0 | 3333 | WR6 | NOOP | NOOP | NOOP | NOOP | |
| 12 | 207 | LI 4 CO | 0004 | X | 0 | Z | CN1 | NOOP | NOOP | NOOP | NOOP | init VAG |
| 13 | 208 | LP 600 | 0004 | 0004 | 0 | Z | NOOP | NOOP | NOOP | NOOP | NOOP | for acc |
| 14 | 209 | LP 600 | 0600 | 0004 | 0 | Z | NOOP | NOOP | NOOP | NOOP | NOOP | setup |
| 15 | 20A | NOOP | 0600 | 0004 | 0 | 0600 | NOOP | INIT | INIT | INIT | NOOP | |
| 16 | 20B | BZGD CO @ 20B | 0600 | 0004 | 1 | Z | NOOP | STEP | STEP | STEP | NOOP | |
| 17 | 20B | BZGD CO @ 20B | 0600 | 0003 | 1 | Z | NOOP | STEP | STEP | STEP | NOOP | |
| 18 | 20B | BZGD CO @ 20B | 0600 | 0002 | 1 | Z | NOOP | STEP | STEP | STEP | NOOP | VAG acc |
| 19 | 20B | BZGD CO @ 20B | 0600 | 0001 | 1 | Z | NOOP | STEP | STEP | STEP | NOOP | setup |
| 20 | 20B | BZGD CO @ 20B | 0600 | 0000 | 1 | Z | NOOP | STEP | STEP | STEP | NOOP | |
| 21 | 20B | BZGD CO @ 20B | 0600 | FFFF | 0 | Z | NOOP | STEP | STEP | STEP | NOOP | |
| 22 | 20B | BZGD CO @ 20B | 0600 | FFFF | 0 | Z | NOOP | EXEC | EXEC | EXEC | NOOP | |
| 23 | 20D | LP 607 | 0600 | FFFF | 0 | Z | NOOP | NOOP | NOOP | NOOP | NOOP | |
| 24 | 20E | LP 607 | 0607 | FFFF | 0 | Z | NOOP | NOOP | NOOP | NOOP | NOOP | |
| 25 | 20F | LP 609 | 0607 | FFFF | 0 | 0607 | NOOP | INIT | NOOP | INIT | NOOP | init |
| 26 | 210 | LP 609 | 0609 | FFFF | 0 | Z | NOOP | NOOP | NOOP | NOOP | NOOP | vector |
| 27 | 211 | LP 2 | 0609 | FFFF | 0 | 0609 | NOOP | NOOP | INIT | NOOP | NOOP | add |
| 28 | 212 | LP 2 | 0002 | FFFF | 0 | Z | CN2 | NOOP | NOOP | NOOP | NOOP | |
| 29 | 213 | LI 3 CO | 0002 | FFFF | 0 | 0002 | NOOP | NOOP | NOOP | NOOP | INIT | |
| 30 | 214 | LI 3 CO | 0003 | FFFF | 0 | Z | NOOP | EXEC | NOOP | EXEC | NOOP | |
| 31 | 215 | NOOP | 0003 | 0003 | 0 | Z | NOOP | EXEC | NOOP | EXEC | EXEC | |
| 32 | 216 | BGZD CO @ 216 | 0003 | 0003 | 1 | Z | NOOP | EXEC | EXEC | EXEC | EXEC | |
| 33 | 216 | BGZD CO @ 216 | 0003 | 0002 | 1 | Z | NOOP | EXEC | EXEC | EXEC | EXEC | |
| 34 | 216 | BGZD CO @ 216 | 0003 | 0001 | 1 | Z | NOOP | EXEC | EXEC | EXEC | EXEC | vector |
| 35 | 216 | BGZD CO @ 216 | 0003 | 0000 | 1 | Z | NOOP | EXEC | EXEC | EXEC | EXEC | add |
| 36 | 216 | BGZD CO @ 216 | 0003 | FFFF | 0 | Z | NOOP | EXEC | EXEC | EXEC | EXEC | |
| 37 | 216 | BGZD CO @ 216 | 0003 | FFFF | 0 | Z | NOOP | STEP | EXEC | STEP | EXEC | |
| 38 | 218 | NOOP | 0003 | FFFF | 0 | Z | NOOP | EXEC | EXEC | EXEC | EXEC | |
| 39 | 219 | NOOP | 0003 | FFFF | 0 | Z | NOOP | NOOP | STEP | NOOP | EXEC | |
| 40 | 21A | NOOP | 0003 | FFFF | 0 | Z | NOOP | NOOP | STEP | NOOP | EXEC | |
| 41 | 21B | NOOP | 0003 | FFFF | 0 | Z | NOOP | NOOP | NOOP | NOOP | EXEC | |
| 42 | 21C | BI @ 21C | 0003 | FFFF | 1 | Z | NOOP | NOOP | NOOP | NOOP | NOOP | |
| 43 | 21C | BI @ 21C | 0003 | FFFF | 1 | Z | NOOP | NOOP | NOOP | NOOP | NOOP | idle |
| 44 | 21C | BI @ 21C | 0003 | FFFF | 1 | Z | NOOP | NOOP | NOOP | NOOP | NOOP | |

There are two instruction registers IR1 and IR2 in ACS 12, one containing the op code and the other containing data values. Register CO contains the loop value and there is an additional output CTRUE which provides branching information. This output is illustrated in FIG. 3 as originating from the instruction register decode 156. The CTRUE signal indicates a branching operation wherein the ACS program is in a loop mode. This information is utilized by the VAGs as an indication that a loop is terminated which allows the VAGs to step their internal PC to proceed to the next instruction. This further reduces the number of steps required to provide an indication that a loop has terminated in the ACS 12.

The program is initiated in the first clock with the hex address 000 put in the PC. During clocks 2 to 4, the ACS 12 is branched to the main program at hex address 200, hex address 200 being placed in the PC during clock 5. The MPS 22 is configured during between clocks 5 and 11 with the microinstruction DUP 4 placed in the register IR1 in clock 6 and the value 4444 placed on the parameter bus in clock 7. In clock 6, the command PT1 is placed onto the control bus for the MPS 22 with the remaining commands and values placed on the bus between clocks 8 and 11. At clock 11, the value 4 is loaded into the register CO and then the VAGs initiated for accumulator set up between clocks 12 and 15 by placing the command CN1 on the MPS control bus in clock 12 and sending an INIT command in clock 15. In clock 15, the starting address 0600 for the VAGs is placed on the parameter bus in accordance with the LP 0600 command in register R1 in clock 13 and clock 14.

After initializing the VAGs as starting address 0600, the accumulators are set up between clock 16 and clock 22. This is a branch operation wherein the ACS 12 branches about the VALU 4 which is loaded in control register in clocks 11 and 12 until the VALU is less than zero. The program in the VAG is stepped from starting address of 0600 through six steps and then an EXEC command sent in clock 22 to the three VAGs.

After setting up the accumulators in the VAG, the vector add operation is initialized at starting address 0607. The value 0607 is loaded onto the parameter bus in clock 25 in accordance with an instruction in the instruction registers in clocks 23 and 24. In clock 25, the INIT command is sent to VAG 1 and VAG 3 to load the starting address 0607. The address 0609 is then loaded onto the parameter bus in clock 27 and the INIT command sent to VAG 2 to load the starting address 0609 in the associated PC. The connection pattern for MPS 22 is performed in clock 28 by sending the appropriate command CN2 and then the value 0002 loaded onto the parameter bus to allow initialization of the VALU 24 with the INIT command in clock 29.

After the VAGs have been initialized for the vector add operation, the vectors are added between clocks 30 and 41. In clock 30 and 31, addresses are generated by VAG 1 and VAG 3 to read data from the memory and place it in the pipeline. In clock 31, the VALU 24 is sent an EXEC command to output results with the result stored by VAG 2 at clock 32 by sending the EXEC command to VAG 2. At this point, ACS 12 is looped around the hex address 216 to clock 37. At clock 37, the PCs in VAG 1 and VAG 3 are stepped to a NOOP command in clock 39. After the last step in the VAG program is executed, the program is stepped to a NOOP instruction for execution thereof. At clock 40 and 41, the VALU 24 program is stepped and executed to terminate the program. ACS 12 is then placed in an idle mode in clocks 42 to 44 by branching about hex address 21C.

The VAGs are only operable between clocks 26 and 43 to perform the vector addition. The status of the various registers and slave devices is illustrated in Table 7.

TABLE 7

| | VAG 1&3 | | | | Mem Data | VALU | | | | | | VAG 2 | | | | Mem Data |
|----|------|-----|------|------|------|------|-----|------|-----|-----|------|------|-----|------|------|------|
| CK | CREG | PC | IR | ADDR | 1&3 | CREG | PC | IR | A0 | A1 | OUTB | CREG | PC | IR | ADDR | 2 |
| 26 | INIT | * | noop | Z | Z | NOOP | * | noop | X | X | X | NOOP | * | noop | Z | Z |
| 27 | NOOP | 607 | noop | Z | Z | NOOP | * | noop | X | X | X | NOOP | * | noop | Z | Z |
| 28 | NOOP | 607 | noop | Z | Z | NOOP | * | noop | X | X | X | INIT | * | noop | Z | Z |
| 29 | NOOP | 607 | noop | Z | Z | NOOP | * | noop | X | X | X | NOOP | 609 | noop | Z | Z |
| 30 | NOOP | 607 | noop | Z | Z | INIT | * | noop | X | X | X | NOOP | 609 | noop | Z | Z |
| 31 | EXEC | 607 | noop | Z | Z | NOOP | 002 | noop | X | X | X | NOOP | 609 | noop | Z | Z |
| 32 | EXEC | 607 | read | 0 | Z | EXEC | 002 | noop | X | X | X | NOOP | 609 | noop | Z | Z |
| 33 | EXEC | 607 | read | 1 | 0 | EXEC | 002 | add | X | X | X | EXEC | 609 | noop | Z | Z |
| 34 | EXEC | 607 | read | 2 | 1 | EXEC | 002 | add | X | X | X | EXEC | 609 | write | 0 | Z |
| 35 | EXEC | 607 | read | 3 | 2 | EXEC | 002 | add | X | X | X | EXEC | 609 | write | 1 | 0 |
| 36 | EXEC | 607 | read | 4 | 3 | EXEC | 002 | add | X | X | X | EXEC | 609 | write | 2 | 2 |
| 37 | EXEC | 607 | read | 5 | 4 | EXEC | 002 | add | X | X | X | EXEC | 609 | write | 3 | 4 |
| 38 | STEP | 607 | read | 6 | 5 | EXEC | 002 | add | X | X | X | EXEC | 609 | write | 4 | 6 |
| 39 | EXEC | 608 | read | 7 | 6 | EXEC | 002 | add | X | X | X | EXEC | 609 | write | 5 | 8 |
| 40 | NOOP | 608 | noop | Z | 7 | EXEC | 002 | add | 6 | 6 | A | STEP | 609 | write | 6 | A |
| 41 | NOOP | 608 | noop | Z | Z | STEP | 002 | add | 7 | 7 | C | EXEC | 610 | write | 7 | C |
| 42 | NOOP | 608 | noop | Z | Z | EXEC | 003 | add | X | X | E | NOOP | 610 | write | Z | E |
| 43 | NOOP | 608 | noop | Z | Z | NOOP | 003 | noop | X | X | X | NOOP | 610 | noop | Z | Z | where:
Z is a tri-stated condition
X is a don't care condition
* means current value painting to NOOP value At clock 26, the central register (CREG) is initialized to load the hex address 607 at clock 27 in VAG 1 and 3. VAG 2 is initiated at clock 28 to load the hex starting address 0609 in the PC at clock 29. The VALU 24 is initialized at clock 30 to input the hex starting address 002 in the PC at clock 31. An EXEC command is sent to VAGs 1 and 3 at clock 31 and a Read operation performed in clock 32 at address zero. In clock 32, the EXEC command is sent to the VALU 24 with the add operation performed at clock 33. An EXEC command is sent to the VAG2 in clock 33 with the Write operation performed in clock 34. The last EXEC command is sent to VAGs 1 and 3 at clock 37 with the Read operation performed until clock 39 due to pipelining in the device. At clock 38, the program is stepped to output a NOOP instruction from the instruction register at clock 40. In a similar manner, the VALU 24 is sent a step command at clock 41 and the VAG 2 is sent a step command at clock 40.

The microprogram code is compressed by utilizing the VAGs 24a–24n and the ACS 12 in accordance with the present invention. This is evident between clock cycles 33 and 37 wherein the same control codes (i.e., the EXEC code) are repeatedly output. The ACS 12 is programmed to enter a tight loop where it addresses the same memory location in its control memory five times from which the EXEC control code is repeatedly output. The same compression occurs when the VAGs are stepped through the accumulator set up macroprogram between clocks 16 and 21. By utilizing the system of the present invention, it is not necessary for the program to loop back on itself to repeat an instruction. This would require additional instructions and fetching operations which are time consuming and require additional microcode.

Forced I/O

Figure 8:
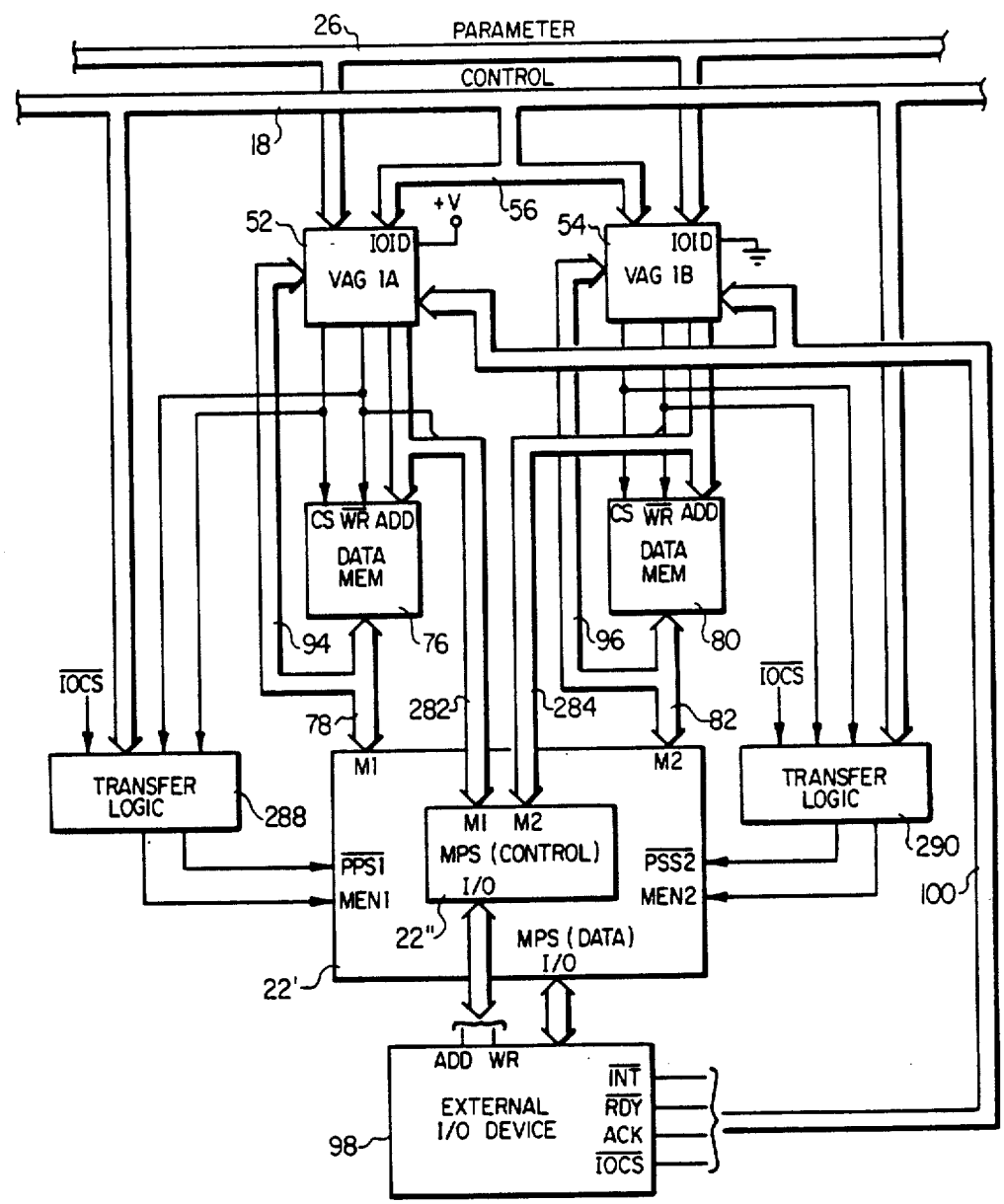
FIG. 8 illustrates a schematic block diagram of a portion of the array processor utilizing forced I/O operations.

Referring now to FIG. 8, there is illustrated an expanded block diagram of the VAGs 52 and 54 operating in the forced I/O or double buffered transfer mode. In this configuration data memories 76 and 80 operate in conjunction with VAGs 52 and 54 and share the same control codes transferred from the control bus through the interconnecting bus 56. Each of the VAGs 52 and 54 generate addresses for a separate memory 76 and 80, respectively. However, one of the VAGs 52 and 54 operates in the foreground and one in the background to perform I/O functions with the external I/O device 98. Initially, both VAGs 52 and 54 are operating in the basic mode and are executing the same program. After both are initialized, the ACS 12 sends a forced I/O microinstruction to the VAGs 52 and 54. Each of these VAGs has an IOID pin which is either connected to a plus voltage or ground. This distinguishes the two. The forced I/O microinstruction selects one or the other. The selected one upon receiving the forced I/O microinstruction will enter into a forced I/O mode of operation during which it ignores all control bus codes except the HALT and the RESET commands. This VAG then sequences itself through an internal forced I/O routine and interfaces with the external I/O device 98 through the handshake lines 100 to control transfer of data and control signals through the MPS 22. The VAG in the forced I/O mode branches to an I/O routine that is stored in the PC branch file 178. The other of the VAGs 52 and 54 in the normal operating mode continues executing the original program and processing data. Thus, one VAG generates data addresses for computational purposes and the other generates data addresses for I/O transfers.

When the transfer of a block of data has been completed to the data memory associated with the VAG in the forced I/O mode, this information is stored in an external status register 280, as illustrated in FIG. 2. The status register is a sixteen bit wide register which stores various status bits that are accessible by the ACS 12 through a discrete I/O port fed to the I/O interface 166 in the ACS 12. The ACS 12 then sends a reset code to both the VAGs which will terminate the forced I/O mode of operation in the VAG operating in that mode. An INIT code then follows the RESET code so that both VAGs can be brought back into sync with the array processor so that both VAGs will be executing the same program again. An alternate forced I/O microinstruction is then transmitted to the VAGs which will cause the other of the VAGs 52 and 54 to enter the forced I/O mode which heretofore had been executing in the foreground. This VAG will then receive data from the I/O device 98 and the VAG previously in the forced I/O mode will process data. This is essentially a "ping pong" operation of the two VAGs 52 and 54 back and forth between foreground and background tasks. By so configuring the VAGs, processing of data and collection of data can occur simultaneously. Since they share the same control bus, the two VAGs appear as a single unit to the ACS. The ACS 12 need only monitor the status register 280 and reinitialize the VAGs associated with that portion of the control bus upon receiving the indication that a block of data has been effectively transferred to the data memory.

MPS 22 is comprised of a data portion 22' and a control portion 22". The data from bus 78 in memory 76 and bus 82 in memory 80 are input to ports M1 and M2 of the data portion 22'. The address and the Write signal of VAG 52 is input along a bus 282 to the M1 input of control portion 22" with the Write signal and address output by VAG 54 being input to the M2 input of control portion 22" along a bus 284. The address and Write signal are output to the external I/O bus 98 from control portion 22' on a bus 286. In addition, MPS 22 requires both a priority signal and an enable signal from each of the VAGs 52 and 54. The VAG 52 generates priority signal PPS1 and an enable signal MEN1 from a transfer logic circuit 288 and the VAG 54 generates priority signal PPS2 and enable signal MEN2 with a transfer logic circuit 290. Transfer logic circuits 288 and 290 utilize the chip select and Write signals from the VAG and the I/O chip select signal from the external I/O device in addition to a signal from the control bus 18.

The external I/O device 98 receives data from the data portion 22' along an I/O bus 292 and generates various handshake signals. The handshake signals are interrupt signal INT, a ready signal RDY and an acknowledge signal ACK and the I/O chip select signal IOCS. These signals are input to both the VAGs 52 and 54 along the lines 100. In addition, the I/O device provides a status register along the I/O bus 292 which is routed to the external status register 280 through the MPS 22.

The MPS control portion 22" and the MPS data portion 22' both contain the same configuration data. The control portion 2" is used to select and route the correct control signals to the I/O device 98. Only one set of control outputs should be enabled at one time to avoid bus collisions. This is controlled by microinstruction execution. Whenever the VAGs 52 and 54 "ping pong", the MPS 22 must be reconfigured by the ACS 12 so that the correct memory port is connected to the I/O port. The transfer logic 288 and 290 controls the priority and enable inputs of the MPS 22 such that bidirectional data transfers may occur during an I/O transfer operation. Rows one through five in the MPS 22 connectivity register file 250 contain I/O to memory connections and Row six contains a memory to I/O connection. Row six connection takes priority and becomes effective over the other five rows whenever the priority input is activated. This is controlled by the VAG chip select and Write signals. A flip-flop is also included in the transfer logic 288 and 290 to signal that the associated VAG 152 or 154 is in the I/O mode of operation. This flip-flop must be set by a special chip select sequence from the external I/O device 98 which requires a transition from a one to a zero and from a zero to a one at the beginning of the I/O operation. The flip-flop in the transfer logic 288 and 290 is then reset when the I/O operation is complete. Thus, the memory outputs are enabled whenever the VAG 52 or 54 is in its basic mode of operation and enabled only when the I/O data transfer takes place during an I/O operation. Otherwise, the memory outputs are disabled such that they are inhibited from clashing with VAG data operations with its associated memory.

Figure 9:
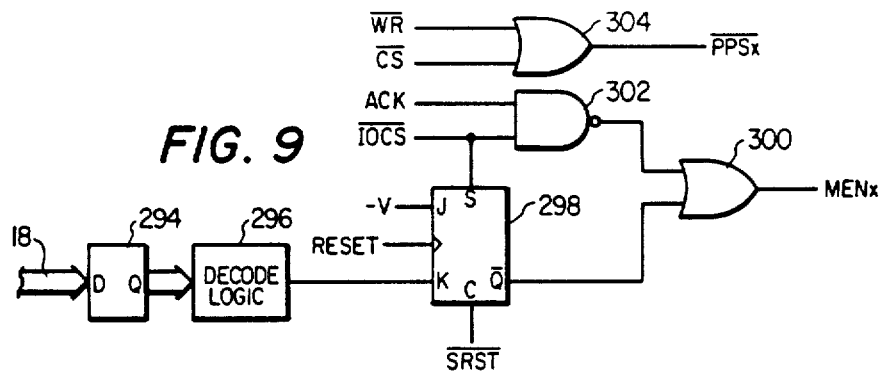
FIG. 9 illustrates a schematic diagram of the transfer logic for forced I/O operation.

Referring now to FIG. 9, there is illustrated a schematic block diagram of the transfer logic circuits 288 and 290. The control bus inputs three bits to a D-type flip-flop 294 which is input to decode logic 296. The output of the decode logic is input to the K-input of a JK flip-flop 298 with the reset signal input to the clock input. The J-input is tied to ground. The I/O chip select signal is input to the set input of the flip-flop 298 with inverted Q output being input to one input of an OR gate 300. The output of the OR gate 300 comprises the enable signal. The I/O chip select signal is also input to one input of a NAND gate 302, the output of which is input to the other input of the OR gate 300. The other input of the NAND gate 302 is connected to the ACK signal. The priority signal is selected by an OR gate 304, the inputs of which are connected to the chip select and write signals from the associated VAG 52 or 54.

Cycle Stealing

The VAGs 106 and 108 labeled VAG 2a and VAG 2b respectively, and the VAGs 66 and 68 labeled VAG 4a and VAG 4b, respectively, are configured in the cycle stealing mode. Cycle stealing mode allows data to be transferred to the associated memory between processing cycles. This corresponds to the time in which a NOOP command is transmitted to the respective VAG, indicating that no address is being generated to the associated program memories. In the cycle steal mode, two VAGs are required with one performing the foreground task and one performing the background task of storing data in the associated memory. Therefore, both share the same memory address bus. One of the VAGs operates only in the cycle stealing mode and the other operates in the processing mode. When a NOOP code is registered by both VAGs, the one in cycle stealing mode becomes active and executes its internal I/O program to generate memory control addresses. The other VAG becomes inactive and tristates its memory bus output so that no bus collisions may occur. When non-NOOP codes are registered, the VAG in the processing mode of operation becomes active while the other goes inactive. Thus, only one VAG can be active at one time and interface with the memory bus.

Figure 10:
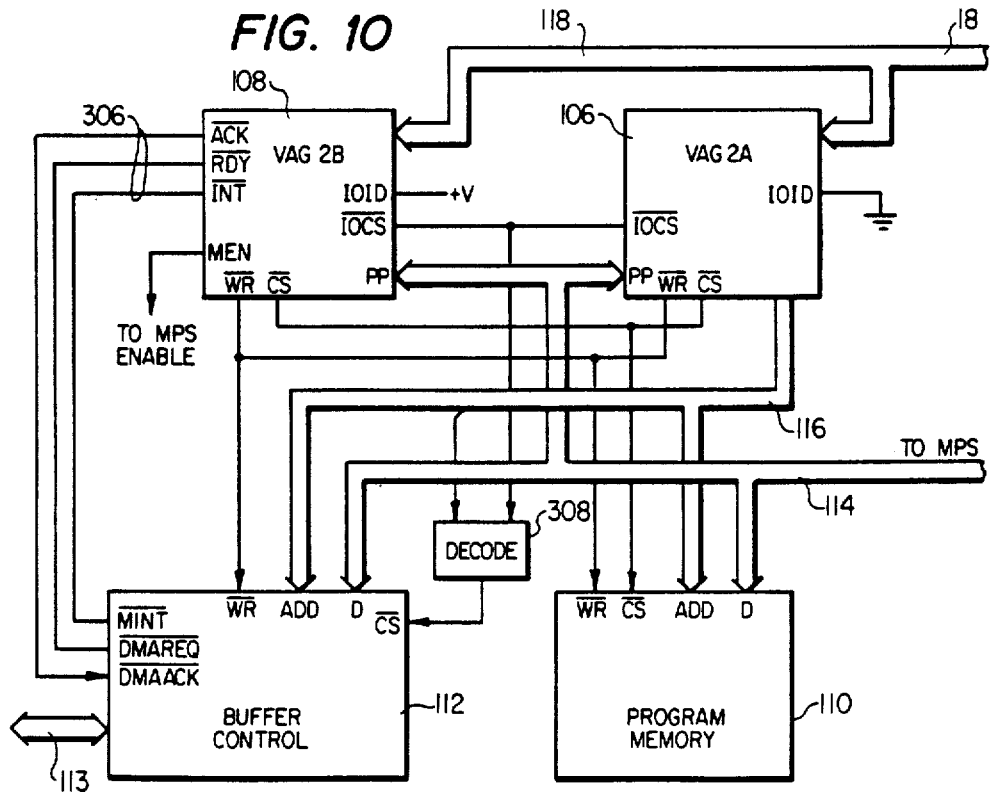
FIG. 10 illustrates a schematic block diagram of the tasking portion of the array processor utilizing cycle stealing.

Referring now to FIG. 10, there is illustrated an expanded block diagram of the VAGs 106 and 108 and the program memory 110 and buffer control 112, wherein like numerals refer to like parts in the various figures. Each of the VAGs has an IOID output pin which is interfaced with the I/O control 218 in the respective VAG. The IOID pin in the VAG 108 is connected to a high logic level and the IOID pin in VAG 106 is connected to ground. This identifies the VAG 108 as the cycle stealing VAG. Each of the VAGs 106 and 108 have the address output thereof connected to the address bus 116, the address bus 116 being connected to both the address input of the program memory 110 and the address input of the buffer control 112. Although the buffer control circuit 112 is not described in detail, there are internal registers that are addressable by VAGs 106 and 108. VAGs 106 and 108 have their parameter bus inputs connected to the data bus 114 which is also connected to the data ports of both program memory 110 and buffer control 112. The data bus 114 allows data to be transferred from system bus 113 to program memory 110 and also allows parameter data to be transferred from MPS 22 to VAGs 106 and 108 and also allows data to be transferred from other memories in the array processor to program memory 110. This data can be transferred out to the system through the buffer control 112.

In initializing VAGs 106 and 108 to the operating and the cycle stealing mode, two passes are required by the ACS 12. The ACS first sends an INIT command to both VAGs 106 and 108 to initialize them to a starting address with both VAGs 106 and 108 powering up in the basic operating mode. The starting address is transferred through MPS 22 and data bus 114 to the parameter bus input thereof. During the first pass, the starting address at which the VAGs are initialized results in VAG 108 entering a cycle stealing mode since the IOID pin is raised high. Once VAG 108 enters the cycle stealing mode, it is only responsive to HALT and RESET commands from the ACS 12. Thereafter, a second INIT command is sent to VAG 106 along with appropriate parameter information on bus 114 to initialize VAG 106 to a particular operating routine. Once the VAG 108 is in the cycle stealing mode, VAG 106 can be controlled to manipulate program memory 110 to extract parameters therefrom for use by the array processor or input data thereto. As described above, the command parameter lists "CPL"p0 are stored in program memory 110. The ACS 12 extracts these lists from program memory 110 to determine the task to be executed. Therefore, program memory 110 is operable to store CPLs in a queue which is defined as a "task queue". ACS 12 sequences through this queue to determine which particular task to operate. These tasks may range from processing data in accordance with a Fast Fourier Transform (FFT) or loading data in the memory for extraction by the data processor through the system bus 113.

Data can either be received from buffer control 12 and stored in program memory 110 or extracted from program memory 110 and transmitted to buffer control 112. The data in buffer control 112 can either be stored external thereto or internally in first-in first-out registers (FIFO). When a NOOP command is sent to VAG 106, VAG 108 can then be activated to interact with buffer control 112 to cause data to be transferred from the internal buffers contained therein to a particular address in program memory 110. To interface with the buffer control, interrupt lines, DMA request lines and DMA acknowledge lines 115 are interfaced therebetween to provide direct memory access (DMA) control. In addition, VAG 108 outputs an enable signal MEN to the MPS 22 to inhibit the transfer of data from MPS 22 on data line 114 in order to avoid any bus collisions. To provide chip select for buffer control 112, a decode circuit 308 has the input thereof connected to the IOCS output signal and also the most significant bit on the address bus 116. The output thereof is connected to the chip select input of buffer control 112. The address bus is input to the buffer control 112 to select one of the internal registers therein in which data is to be stored. However, buffer control 112 merely acts as a control circuit for interfacing data between data processor 10 and the array processor and, therefore, any type of buffer control circuit can be utilized.

The VAGs 66 and 68 operate similar to VAGs 106 and 108. VAG 68 operates in background to VAG 66 and is operable to load data from data memory 88 into auxiliary display 92 when a NOOP code is sent to VAG 66. During normal operation, VAG 66 is operable to load data into data memory 88 from MPS 22 for use with auxiliary display 92.

In summary, there has been provided an array processor which utilizes a master processor and a plurality of slave processors. The master processor is operable to sequence the slave processors through a sequence of parallel interleaved instructions that are synchronously executed. The slave processors are operable to generate addresses to associated memories for manipulation of data therein. The data output of the memories is interfaced through a cross point switch to a data processor for processing the data. The master processor sends commands to each of the slave processors to initiate an internal routine in the slave processors to generate the addresses for the data memories. Each step in the internal routine of the slave processors is sequenced through by the master processor.

Although the preferred embodiment has been described in detail, it should be understood that various changes, substitutions and alterations can be made therein without departing from the spirit and scope of the invention as defined by the appended claims.

What is claimed is:

1. A processor for processing data, comprising:
    a master processor for generating sequence commands to control instruction flow in the processor;
    first and second slave processors, connected to said master processor, having internal instructions stored therein, for receiving common ones of said sequence commands from said master processor and executing internal instructions in response thereto, wherein addresses and control signals are generated, said first and second processors operating in either a data processing mode or an I/O mode, sequence commands from said master processor determining which mode said first and second slave processors are in such that one of said slave processors operates in the I/O mode and one of the slave processors operates in the data processing mode;
    first and second data memories having data ports and connected to said first and second slave processors, repsectively, for storing data and operating in response to addresses and control signals generated by the first and second slave processors to either receive and store data from, or retrieve and output data to, the data ports;
    a data processor, having an input and an output port, for receiving data on the input port and processing received data in accordance with a predetermined data processing function and outputting results on the output port;
    a reconfigurable switch for interconnecting the data ports of said data memories with both the input and output ports of the data processor and an I/O port, the I/O port interfaced with an external I/O device for generating data for input to the I/O port and for receiving data output by the I/O port, said switch being configured in accordance with one of a plurality of predetermined connectivity patterns stored internal thereto and selected in repsonse to receiving a sequencing command from said master processor;
    status register means connected to said first and second memories for containing status information as to the status thereof to determine if the memory connected to a slave processor operating in the I/O mode has completed the I/O mode, said master processor means operating in response to completion of an I/O mode in one of said data memories to force the slave processor connected to the other data memory into an I/O mode to continue receiving or transmitting data to the I/O port through said switch, wherein said switch reconfigures to connect such that other data memory to the I/O port.

2. The processor of claim 1 wherein the connectivity patterns stored in said switch are loaded thereto from said master processor, and further comprising a parameter interface for interfacing said master processor to said switch.

3. The processor of claim 2 wherein said parameter interface is interfaced with said first and second slave processors to allow said master processor to input parameters to said slave processors for use in executing the internal instructions therein.

4. The processor of claim 1 further comprising handshake means for interfacing between said first and second slave processors and said I/O port to receive status signals from the external I/O device to determine status control information therefrom.

5. The processor of claim 1 wherein said first slave processor has an I/O designation input that resides at a first logic state and said second slave processor has an I/O designation input that resides at a second logic state, wherein one of said sequence commands controls which of said first and second slave processors is in the I/O mode corresponding to the logic state on the designation input such that said first and second slave processors can be flip-flopped between the data processing mode and the I/O mode.

6. An array processor for processing data, comprising:
    a control processor for generating sequencing commands to control instruction flow in the array processor;
    first, second and third slave address processors connected to said control processor and each having internal instructions therein, for receiving the sequencing commands to sequence through the internal instructions in response thereto, the internal instructions at each of said slave address processors sequencing in parallel and synchronously to generate addresses and control signals;
    said first slave address processor receiving a separate one of the sequencing commands;
    said second and thrid slave address processors both receiving a common one of the sequencing commands separate from said first slave address processor, said first and second slave address processors operating in either an 1/0 mode or a data processing mode in response to a predetermined sequence command such that only one of said second and third slave address processors is operating in the I/O mode, wherein the processor operating in the I/O mode is not responsive to further sequencing commands and operates independent of said control processor;
    first, second and third data memories having data input/output ports and connected to each of said first, second and third slave address processors, respectively, for storing data therein, said data memories operating in response to addresses and control signals to either output stored data or receive data for storage therein;
    an array data processor for receiving data on input ports and processing received data in accordance with a predetermined data processing function for output of results on an output port;
    switch means having memory ports interfaced with the data input/output ports of said data memories, processor ports interfaced with the data input/output ports such that the input/output are interfaced with an external I/O device for transfer of data therebetween, said switch means for interconnecting said input/output ports to either said array data processor ports or said I/O ports in a predetermined configuration in accordance with a select one of a connectivity patterns stored in a connectivity register, said select patterns selected in response to the sequencing commands from said control processor, with only said second and third data memories inteconnected with said I/O ports;

said second and third slave address processors are controlled by the sequencing commands to operate such that one thereof is forced to the I/O mode of operation and the other thereof is in the data processing mode and operates on the sequencing commands, the one thereof in the forced I/O mode controlling the connected data memory for receiving data from the external I/O device or transferring data thereto, wherein completion of an I/O operation, wherein data is completely transferred from or stored in a data memory changes a status of said data memories, said control processor forcing the other of said second and third slave address processor into the I/O mode when the status changes.

7. The array processor of claim 6 wherein said data processor is reconfigurable and has a plurality of data processing functions stored therein, said data processor means operating to receive sequencing commands from said control processor to select one of the data processing functions to perform.

8. The array processor of claim 6 further comprising parameter interface means for interfacing with said control processor and said slave address processors for allowing said control processor to input parameters to said slave address processors.

9. The array processor of claim 8 wherein said switch means operates to receive from said parameter interface means connectivity patterns for storage in said Connectivity register for alteration thereof.

10. The array processor of claim 6 wherein said second and third slave address processors have designation inputs, said second slave address processor having its designation input set at a first logic state and said third slave processor having its designation input set at a second logic state, said control processor outputting a sequencing command having encoded therein either the first or the second logic state such that the logic state in the sequencing command determines the one of said second and third slave processor that operates in the I/O mode.

11. The array processor of claim 6 further comprising handshake means for interfacing said second and third slave processors with the data processor to synchronize the transfer of data therebetween, wherein data transfer between the external I/O device and the slave processor operating in the I/O mode is asynchronous with respect to instruction flow in the slave processor operating in the data processing mode and said first slave processor.

12. A method for processing data and interfacing with an external I/O device, comprising:
storing data processing instructions at a first slave node, a first set of data processing instructions at a second slave node, and a first set of I/O instructions at the second slave node;
generating sequence commands at a master node for controlling instruction execution at the slave nodes;
receiving the sequence commands at each of the slave nodes to sequence through select one of the instructions to generate address and control signals for data processing functions in response to execution of the stored data processing instructions, the instruction sequenced sunchronously with the sequence commands; ructions at the
initiating execution of the I/O instructions at the second slave node in response to select ones of the sequence commands to generate I/O addresses and control signals, execution of the I/O instructions being independent of the sequence commands after initiation thereof;
providing data memories at the first and second slave nodes and an I/O memory at the second slave node;
addressing the data memories in response to generation of addresses and control signals at the first and second slave nodes and addressing the I/O memory of the second slave node in response to I/O addresses and control signals generated at the second slave node, addressing of the data memories allowing receipt and storage of data from a data port or output of data to the data port;
interconnecting the data memories with a data processor and interfacing the I/O memory with an external I/O port for interfacing with the external I/O device for data transfer therebetween;
processing input data received at the data processor in accordance with a predetermined data processing function and outputting results therefrom for storage in one of the data memories; and
providing status to the master node indicating whether an I/O operation is complete at the second slave node.

13. The method of claim 12 further comprising storing a second set of data instructions at the second slave node and a second set of I/O instructions at the second slave node, the data memory at the second slave node operating as both and I/O memory and a data memory and the I/O memory of the second slave node operating as both a data memory and an I/O memory and further comprising generating sequence commands at the master node to initiate execution of the second set of I/O instructions for generating I/O addresses and control signals for the I/O memory in response to an indication that an I/O operation under the first set of I/O instructions is complete, initiation of the second set of I/O instructions also initiating data processing with the second set of data processing instructions such that I/O instructions and data processing instructions execute together.

14. The method of claim 12 further comprising indicating the status of an I/O operation under the second set of I/O instructions and initiating I/O operation of the first set of I/O instructions in response to the I/O operation under the second set of I/O instructions being complete such that I/O operation is alternated between the first and second set of I/O instructions and transfer of I/O data occurs between one of the data or I/O memories and the I/O port, and the other is utilized in processing data in accordance with the first or second set of data processing instructions.

15. The method of claim 12 further comprising storing interconnect data to represent a plurality of interconnect patterns, the data memory interconnected with the data processor and the I/O port in accordance with one of the interconnect patterns and further comprising selecting one of the interconnect patterns in response to the sequence commands from the master node.

16. The method of claim 12 further comprising reconfuguring a data processing fuction of the data processor in accordance with sequence commands received from the master node, the data processor having a plurality of data processing functions, only one of which is selected by the sequence commands from the master node.

* * * * *